United States Patent [19]

Gaylord et al.

[11] Patent Number: 5,681,069
[45] Date of Patent: Oct. 28, 1997

[54] DEVICE FOR SUPPORTING A REAR BOW OF AN AUTOMOTIVE CONVERTIBLE TOP

[76] Inventors: Mark Timothy Gaylord, 3419 Richards Way, Lake Orion, Mich. 48360; Michael Robert Uhlmeyer, 1314 N. Altadena, Royal Oak, Mich. 48067; Ryan Wayne Massey, 2662 Beacon Hill Dr. Apt. 311, Auburn Hills, Mich. 48326

[21] Appl. No.: 583,742

[22] Filed: Jan. 17, 1996

[51] Int. Cl.$^6$ ........................................ E05C 17/44
[52] U.S. Cl. .................... 292/338; 296/136; 292/DIG. 5
[58] Field of Search ........................... 292/338, 228, 292/274, 265, 259, DIG. 14, 115; 296/136

[56] References Cited

U.S. PATENT DOCUMENTS

| | | | |
|---|---|---|---|
| 2,019,803 | 11/1935 | Tusher | 292/338 |
| 3,743,045 | 7/1973 | Hansen | 292/DIG. 14 X |
| 4,600,233 | 7/1986 | Boydston | 296/136 X |
| 4,611,680 | 9/1986 | Redenbarger et al. | 292/259 R |
| 4,746,163 | 5/1988 | Muscat | 296/136 X |
| 4,799,729 | 1/1989 | Muscat | 296/136 |
| 4,858,972 | 8/1989 | Salyer | 292/338 |
| 4,867,494 | 9/1989 | Castiglioni | 292/338 X |
| 4,925,223 | 5/1990 | Craft | 292/265 X |
| 5,064,241 | 11/1991 | Ohrle | 292/DIG. 5 X |
| 5,173,991 | 12/1992 | Carswell | 292/265 X |
| 5,197,778 | 3/1993 | Burst | 296/136 |
| 5,267,769 | 12/1993 | Bonne et al. | 297/107 |
| 5,516,168 | 5/1996 | Tomaszewski-Link | 292/338 |
| 5,570,493 | 11/1996 | Gulick | 292/338 X |

Primary Examiner—Rodney M. Lindsey
Assistant Examiner—Monica E. Millner

[57] ABSTRACT

A prop device for assembly on a vehicle having a convertible top and a tonneau cover. The prop device is adapted to support a five bow of the convertible top in a suspended position. The prop device includes a mounting bracket adapted to be mounted on the tonneau cover and a pivoting arm attached to the mounting bracket at a first end thereof. The pivoting arm has a curved bow engaging portion at a second end thereof.

6 Claims, 2 Drawing Sheets

DEVICE FOR SUPPORTING A REAR BOW OF AN AUTOMOTIVE CONVERTIBLE TOP

BACKGROUND OF THE INVENTION

1. Field of the Invention

The present invention relates to a prop device for assembly on a vehicle having a convertible top and a tonneau cover. More particularly, the prop device is adapted to support a rear bow of the convertible top in a suspended position.

2. Description of Background Art

Automotive vehicles have long been provided with convertible tops. A typical convertible top design is sometimes referred to as a "five-bow" convertible top. The five-bow convertible top essentially has five bows for supporting a fabric cover. The convertible top is folded into a storage compartment located behind the vehicle passenger compartment. A front bow often referred to as a "one bow", is provided for supporting the fabric cover adjacent to the windshield. Three central bows support the body of the fabric cover. A rear bow commonly called the five bow of the convertible top is provided for supporting the rear of the fabric cover. A tonneau cover is pivotally provided over the storage compartment. The tonneau cover serves as a cover for the storage compartment and also serves as a base for the five bow when the convertible top is in the up position.

In order to raise the convertible top from the storage compartment, the tonneau cover must be lifted and the convertible top is pivoted out of the storage compartment. The front bow is attached to the windshield header and the three central bows pivot forward to support the fabric cover. The five bow is then lifted upward so that the bow clears the opening of the storage compartment. The tonneau cover is then pivoted to a closed position and the rear bow is placed down on the top of the tonneau cover.

It is common in many of the five bow convertible top designs that the convertible top storage compartment is utilized for storing cargo while the convertible top is in an up position. In order to access this storage compartment, the bow of the convertible top must be pivoted upward and the tonneau cover must be pivoted to its open position. A common problem with most five bow convertible top designs is that in order to place an item in the storage compartment, the five bow of the convertible top must be supported in the suspended position while the item is inserted. It can be very cumbersome for a person to hold the five bow of the convertible top in a suspended position with one hand and insert, for example, a bag of groceries with the other. Accordingly, it is desirable in the art to provide a prop device for suspending the five bow of the convertible top.

SUMMARY OF THE INVENTION

It is an object of the present invention to provide a prop device for a five bow of a convertible top of a vehicle that can be mounted on the underside of a tonneau cover.

It is a further object of the present invention to provide a prop device for suspending the five bow of a convertible top which is simple in structure, inexpensive to manufacture, easy to mass produce, durable in use and refined in appearance.

These and other objects of the present invention are obtained by providing a prop device for assembly on a vehicle having a convertible top and a tonneau cover, said prop device adapted to support a five bow of said convertible top in a suspended position, said prop device comprising: a mounting device adapted to be mounted on an underside of said tonneau cover; and a pivoting arm attached to said mounting device and adapted to support a five bow of said convertible top in a suspended position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 1:
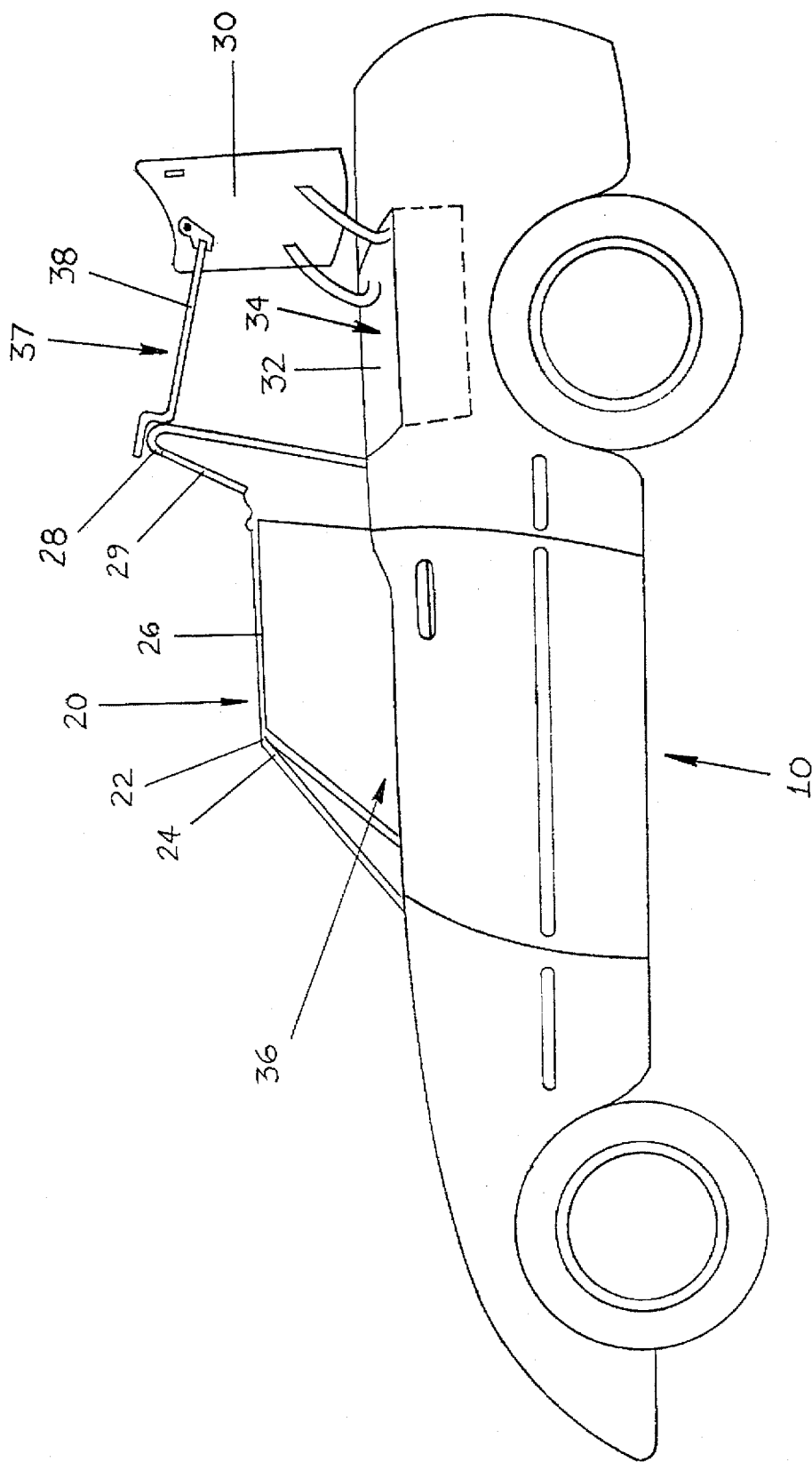
FIG. 1 is a perspective view of a convertible top of a vehicle with a prop device attached to the underside of the tonneau cover according to the principles of the present invention.

With reference to FIG. 1 the prop device according to the present invention will be described. In FIG. 1 a vehicle body 10 is shown having a convertible top 20. The convertible top 20 includes a front bow 22 which attaches to the windshield header 24. A second, third and fourth bow (not numbered) are provided for supporting the central portion of the fabric cover 26. A five bow 28 is provided for supporting the rear 29 of the fabric cover 26.

When the convertible top 20 is in the up position, the five bow 28 rests on a tonneau cover 30. The five bow 28 and the tonneau cover 30 pivot upward to provide an opening 32 for a storage space 34 provided behind a vehicle passenger compartment 36. The storage space 34 provides a storage compartment for the convertible top when it is in its down position as well as providing a storage space for cargo when the convertible top is up.

Figure 3:
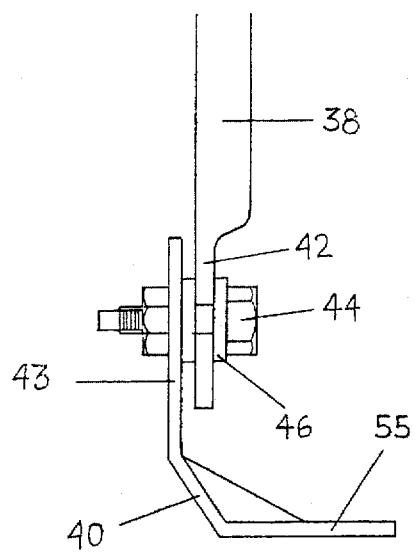
FIG. 3 is a detail view of the pivoting arm attached to the mounting bracket by a bolt and bushing assembly.

In order to gain access to the storage space 34 a prop device 37 is provided for supporting the five bow 28. The prop device 37 includes a pivoting arm 38 which is mounted to the underside of the tonneau cover 30 by a mounting bracket 40. The pivoting arm 38 has a first end 42 which attaches to a pivoting arm supporting portion 43 of the mounting bracket 40. According to a first embodiment as shown in FIG. 3, the first end 42 of the pivoting arm 38 is connected to the mounting bracket 40 by a bolt 44. The bolt 44 is preferably provided with a plastic bushing 46 between the mounting bracket 40 and the bolt 44.

Figure 4:
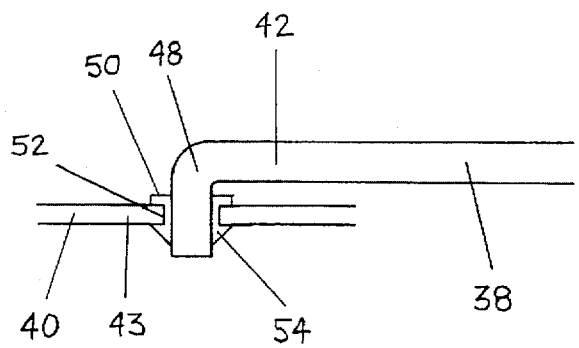
FIG. 4 is a detail view of the pivoting arm attached to the mounting bracket by a retaining clip.

According to yet another embodiment as shown in FIG. 4, the first end 42 of the pivoting arm 38 is provided with a 90 degree bend 48 having a retaining clip 50 disposed on an end thereof. The retaining clip 50 is received in a hole 52 in the mounting bracket 40. The retaining clip 50 has a plurality of radially extending fingers 54 which lock the pivoting arm 38 in pivotal engagement with the mounting bracket 40.

The mounting bracket 40 is preferably designed to have a base portion 55 adapted to be mounted on an existing bolt on the underside of the tonneau cover 30. A detail view of the mounting bracket 40 is shown in FIG. 3.

Figure 2:
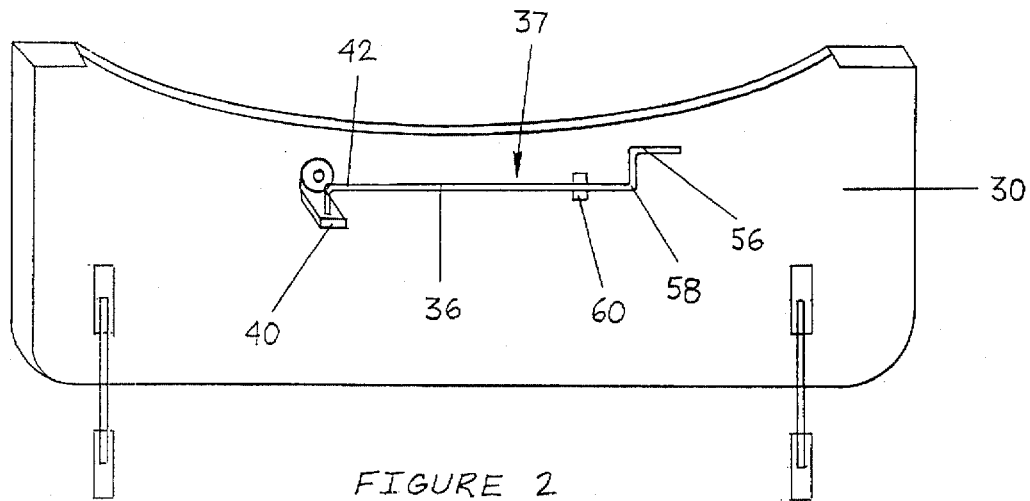
FIG. 2 is a perspective view of a prop device according to principles the present invention.

The pivoting arm 38 has a second end 56 with a curved portion 58 for supporting the five bow 28 of the convertible top 20. As shown in FIG. 2, the pivoting arm 38 is held in a stowed position by a clip 60. The clip 60 is mounted to the underside of the tonneau cover 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In combination a prop device mounted on an automobile, comprising:
    a vehicle body having a convertible top including a movable rear bow attached along a rear portion of said convertible top;
    a tonneau cover pivotally attached to said vehicle body for covering a storage compartment for said convertible top;
    a prop device including a mounting bracket attached to a bottom surface of said tonneau cover and an arm member attached to said mounting bracket, said arm member being pivotable from a first stored position adjacent to said bottom surface of said tonneau cover to a second position for supporting a rear bow of said convertible top when said tonneau cover and said rear bow of said convertible top are each in an upright position.

2. The combination according to claim 1, wherein said first end of said arm member includes a flattened portion having a hole therein.

3. The combination according to claim 2, wherein said arm member includes a second end with a bent portion for engaging said rear bow of said convertible top.

4. The combination according to claim 3, wherein said bracket includes a base portion for mounting to said tonneau cover and an arm supporting portion.

5. The combination according to claim 4, further comprising a plastic bushing between said arm supporting portion of said bracket and a first end of said arm member.

6. The combination according to claim 1, further comprising a latch mechanism mounted to bottom surface of said tonneau cover for holding a second end of said arm member.

* * * * *